INVENTOR.
ARTHUR M. HOWALD
BY Marshall & Yeasting
Attorneys

United States Patent Office 3,523,034
Patented Aug. 4, 1970

3,523,034
FLY FISHING LINE WITH WATER-REPELLENT PRESERVATIVE DRESSING
Arthur M. Howald, Perrysburg, Ohio, assignor to Soo Valley Company, Columbia, S.C., a corporation of South Carolina
Filed Feb. 5, 1968, Ser. No. 703,146
Int. Cl. A01k 91/00; B32b 27/12
U.S. Cl. 117—76     3 Claims

ABSTRACT OF THE DISCLOSURE

A fly fishing line having a surface layer of plasticized polyvinyl chloride, and a water-repellent preservative dressing on the surface layer, consisting essentially of a primary plasticizer for the polyvinyl chloride, paraffin wax and a metal soap of the class consisting of aluminum, calcium and magnesium soaps to inhibit crystallization of the paraffin wax.

BACKGROUND OF THE INVENTION

This invention relates to a fly fishing line having a surface layer of plasticized polyvinyl chloride, and a dressing on the surface layer which preserves the flexibility of the line and which is water-repellent so as to cause the line to float lightly upon the surface of the water.

A known type of fly fishing line consists of a filamentous core surrounded by a flexible surface layer of plasticized polyvinyl chloride. Such a fly fishing line is customarily produced by coating a braided nylon core with a surface layer consisting of a polyvinyl chloride plastisol. A polyvinyl chloride plastisol consists essentially of a suspension of finely divided polyvinyl chloride in a liquid phase that is made up of one or more plasticizers. The final step in the manufacture of such a line consists in heating to a temperature of 350–380° F. When a polyvinyl chloride plastisol is heated to such a temperature, the polymer fuses and goes into solution in the plasticizer phase. The resulting solution of the polymer in the plasticizer, upon cooling, is no longer a liquid, but is a flexible solid surface layer surrounding the braided nylon core.

In order to obtain a fly fishing line of the required low density, it has been found to be necessary to incorporate in the plastisol ingredients which cause the surface layer of plasticized polyvinyl chloride in the final product to be cellular in character. Methods of producing a fly fishing line having a cellular surface layer of plasticized polyvinyl chloride are disclosed in U.S. Pat. Nos. 2,862,282 and 3,043,045.

Pat. No. 3,043,045 states that a fishing line produced by the method disclosed in that patent floats upon the water without any surface dressing. A line produced by that method may have a specific gravity of about 0.95. However, the mere fact that a fly fishing line has a specific gravity of 0.95 does not provide sufficient buoyancy to give satisfactory results. Such a line, unless it has a water-repellent surface, will float partially submerged.

A fly fishing line, in order to give satisfactory results, must have a highly water-repellent surface so that it floats lightly on the surface of the water, supported by the surface tension, so as to enable the fisherman to pick the line cleanly off the water whenever a new cast is to be made.

The difficulty of securing proper flotation of a fly fishing line is increased by reason of the fact that the line must have sufficient weight per foot to permit the fisherman to cast the fly through the desired distance, since the weight of the fly itself may be regarded as negligible. Even in the case of a line having a density that is approximately equal to or slightly less than that of water, the line must be of substantial diameter in order that it may have sufficient weight per foot to permit the line to be cast. The substantial diameter of the line results in a substantial area of contact between the line and the water on which the line is floating, and this substantial area of contact increases the tendency of the line to carry an excessive amount of water when the fisherman picks the line off the surface of the water in order to make a new cast.

It has been found that a fly fishing line having a surface layer of plasticized polyvinyl chloride tends to stiffen with age. Such stiffening is due to gradual loss of the plasticizers, which have some degree of volatility and are to some extent extracted by water. The stiffening of a fly fishing line with age, like the tendency of a line to carry an excessive amount of water when the fisherman picks the line off the surface of the water to make a new cast, will interfere with the action of the line in casting, and will make it more difficult to cast the line so as to drop the fly at the desired spot on the surface of the water.

SUMMARY OF THE INVENTION

The principal object of the invention is to provide a novel dressing which, when applied to a fly fishing line having a surface layer of plasticized polyvinyl chloride, substantially increases the water-repellency of the surface and also preserves the line against stiffening with age. More specific objects and advantages are apparent from the following detailed description, which is intended to disclose and illustrate but not to limit the invention.

A fly fishing line having a surface layer of plasticized polyvinyl chloride possesses a substantial degree of water-repellency, and Pat. No. 3,043,045 states that a fly fishing line having a surface layer of cellular plasticized polyvinyl chloride produced by the method described in that patent does not require any surface dressing. Of course the water-repellency of a fly fishing line having a surface layer of plasticized polyvinyl chloride will not be improved by the application of a dressing unless the water-repellency of the dressing is appreciably greater than the water-repellency of the untreated surface layer.

The present invention is based upon the discovery that the water-repellency of any fly fishing line having a surface layer of plasticized polyvinyl chloride can be improved substantially, so as to improve the results obtained when the line is used in fly fishing, by applying to the line a dressing consisting essentially of a primary plasticizer for the polyvinyl chloride, paraffin wax, and an aluminum, calcium or magnesium soap, and upon the further discovery that such a dressing preserves the line against stiffening with age.

DESCRIPTION OF THE PREFERRED EMBODIMENTS

Figure 1:
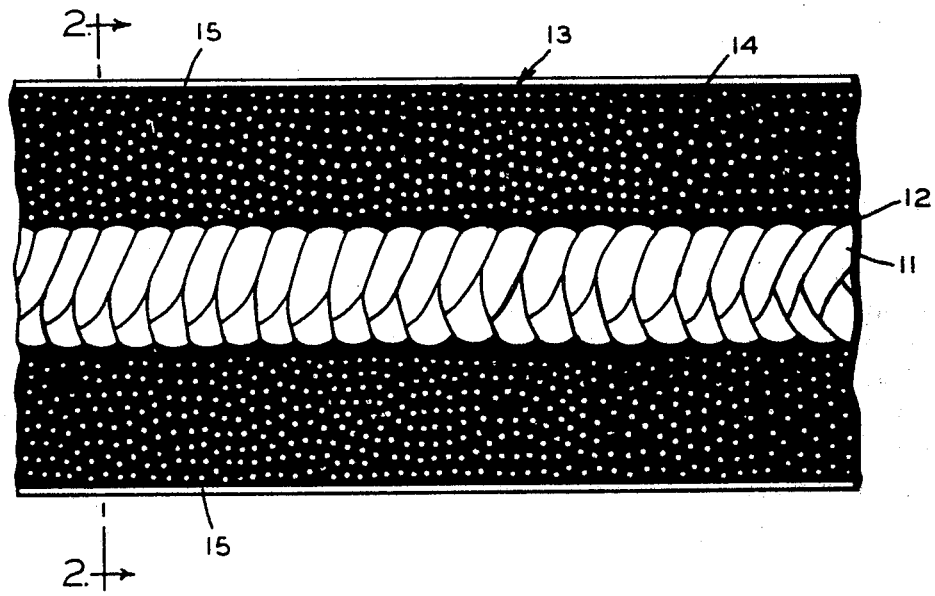
FIG. 1 of the drawing is a longitudinal section, on an enlarged scale, of a fly fishing line embodying the invention.
Figure 2:
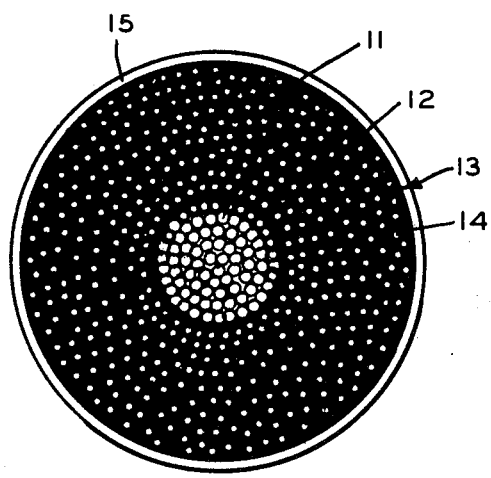
FIG. 2 is a transverse section on the line 2—2 of FIG. 1.

A fly fishing line embodying the present invention comprises a filamentous core surrounded by a flexible surface layer. The core may consist of a single filament or a multiplicity of filaments, and it preferably has substantially greater tensile strength and substantially less elongation than the material of the surface layer. When the core contains more than one filament, the filaments may be braided, twisted or laid side by side. The core may consist of nylon, Dacron (a polyester), silk or any suitable filamentous material. When the core has substantially greater total tensile strength and substantially less elongation than the surface layer of the line, it is the core which determines the tensile strength of the line, as well as the degree to which the line will stretch or elongate, because under a tensile load the surface layer tends to longate freely and thus permits the core to take the load. Under such circumstances, the elongation or stretchability of the line is substantially that of the core, and the tensile strength of the line is substantially equal to that of the core. In that way, the core prevents the line from being excessively "soft" under tension, so as to enable the fisherman to set the hook by a jerk on the line after a fish has taken the fly.

Although the core may determine the tensile strength and elongation of the line, the core alone, before the addition of the surface layer, is much more flexible than is desirable in a fly fishing line. The necessary critical degree of flexibility is imparted to the present fly fishing line by the surface layer surrounding the core.

When the core consists of a monofilament of nylon having a diameter more than about 0.12 inch, it is desirable that the nylon be a modified nylon of the type known as "limp nylon" which is sufficiently flexible so that the overall stiffness of the line will not be excessive.

Ordinarily the core is a multi-filament core, which is substantially more flexible than a monofilament core.

Before the surface layer is applied to the core, it is desirable to coat the core with a primer which improves the adherence of the surface layer to the core and insures the formation of a good bond between the surface layer and the core.

The primer should be applied in the form of a relatively non-viscous liquid which flows freely so as to wet the core thoroughly. The primer may consist of a solution of any synthetic resin that is compatible with the plastisol which is to be applied as the surface layer. For example, the primer may consist of a solution of a copolymer of vinyl chloride and vinyl acetate in methyl isobutyl ketone. Another primer which may be employed is an acrylonitrile-butadiene copolymer solution in methyl ethyl ketone or methyl isobutyl ketone.

If desired, the primer solution may be applied while hot, in order to increase the solubility of the synthetic resin in the solvent employed. The primer may be applied to the core in a continuous operation, by passing the core continuously through a tank of the primer and then exposing the core to radiant heat or to circulated hot air in order to evaporate the solvent from the primer and to remove moisture from the core.

After the core has been coated with a primer and dried, the surface layer is applied to the core in the form of a plastisol. The polymer in the plastisol used in the practice of the invention consists essentially of polymerized vinyl chloride, but the vinyl chloride used to form the polymer may be copolymerized with small proportions of other monomers, e.g., with a proportion of vinyl acetate equal to about one half of one percent of the weight of the vinyl chloride used. For example 96% of the vinyl chloride may be present in the form of a homopolymer, and the other 4% of the vinyl chloride may be present in the form of a copolymer obtained by the copolymerization of 4 parts of vinyl acetate with 35 parts of vinyl chloride, the copolymer being dissolved in the plasticizer in which the fine particles of the homopolymer are suspended to form the plastisol.

A polymer for use in the plastisol may be prepared by emulsion polymerization. Preferably the polymer is in the form of a powder having a particle size of the order of one micron, which may be mixed with one or more plasticizers to produce a plastisol.

The plasticizers which may be employed include all of the plasticizers which are useful in the production of flexible polyvinyl chloride products. These known plasticizers include di-octyladipate, di-2-ethylhexyl phthalate, dicapryl phthalate, tricresyl phosphate and trioctyl phosphate.

Minor proportions of resin-type plasticizers also may be added to increase the viscosity of the plastisol and to obtain the desired properties in the finished product.

The proportion of plasticizers in the plastisol depends upon the particular plasticizers and the particular polymer used, and may vary from about 30 to about 70 parts of platsicizers to 100 parts of polyvinyl chloride.

In accordance with usual practice, the plastisol should contain from about one to about four parts of a stabilizer for each 100 parts of polyvinyl chloride. The stabilizer may be a substance which combines with hydrogen chloride liberated from the polyvinyl chloride, such as a lead soap. Other stabilizers which may be employed include soaps of zinc and cadmium, and epoxides.

Other modifiers, such as pigments or dyes, may be added in small proportions if desired, without affecting the quality of the final product.

The specific gravity of plasticized polyvinyl chloride is from about 1.2 to about 1.3. Therefore, in the production of a fly fishing line in which the surface layer consists of plasticized polyvinyl chloride, it is customary to reduce the specific gravity of the surface layer by forming gas bubbles in the surface layer or by incorporating hollow microspheres in the surface layer in order to produce a more buoyant line.

A cellular surface layer may be produced by incorporating in the plastisol a conventional blowing agent, as described in U.S. Pat. No. 2,862,282. During the fusing operation the blowing agent decomposes to liberate a gas such as nitrogen. The blowing agent is dispersed in the plastisol in the form of fine particles, so that in the finished product a gas bubble may be present in the vicinity of each particle, although the gas bubbles generated by a number of particles may merge to form a single gas bubble. In this way it is possible to produce a fly fishing line having an average specific gravity less than 1.0.

Another method of producing a fly fishing line which has reduced specific gravity consists in incorporation in the plastisol, before the plastisol is applied to the core, of hollow microspheres such as glass microballoons, as described in U.S. Pat. No. 3,043,045.

The glass microballoons may be produced as described in U.S. Patents Nos. 2,978,339 and 2,978,340. The composition of the glass preferably consists of oxides of an alkali metal and silica, together with small proportions of other oxides, such as an oxide of boron. The molar proportion of silica in the glass preferably is greater than the molar proportion of sodium or other alkali metal, and preferably is at least three times as great.

The diameter of the glass microballoons may be of the order of 10 to 270 microns and the average diameter may be of the order of 100 microns. The wall thickness of the microballoons is of the order of one percent of the diameter.

The proportion of glass microballoons to be dispersed in the plastisol depends upon the initial density of the plastisol and upon the final density desired. Usually the specific gravity of the plastisol is about 1.2 to 1.3, so that the incorporation of 10–11% by weight of the glass microballoons in the plastisol will bring the specific gravity of the composition to about 0.95.

A braided nylon core usually is hollow in form and therefore contributes to the buoyancy of the line.

The fly fishing line of the present invention may be produced from a core and a plastisol by means of the apparatus disclosed in U.S. Pat. No. 2,862,282. In the operation of that apparatus, the core which has been coated with a primer is passed continuously through a tank containing the plastisol. The core, which becomes coated with a relatively thick layer of the plastisol, is drawn vertically out of the plastisol, and passes through an opening formed at the line of contact of two rollers which have circumferential grooves that register to form a passage between the two rollers at the line of contact. In that apparatus, the size of the opening or passage between the rollers at the line of contact may be varied gradually as the operation proceeds. The diameter of the finished product is determined by the diameter of the opening through which the coated core is drawn between the rollers. In order to produce a tapered fly fishing line embodying the invention, the diameter of the opening between the rollers is varied gradually as the coated core passes between the rollers, thus varying the thickness of the layer of plastisol surrounding the core so as to provide the desired taper.

Preferably the diameter of the core itself is uniform throughout the length of the line.

A line which has been prepared by the procedure hereinbefore described is in its final form, except that the surface layer consists of a relatively soft plastisol. In order to harden the surface layer, the line is then heated to a temperature between 350 and 380° F., preferably by passing the coated core continuously through an oven in which it is subjected to radiant heat.

During this heating operation, the polyvinyl chloride is fused so as to convert the plastisol to a solution of the polyvinyl chloride in the plasticizers. The length of time during which the line is held at a temperature between 350 and 380° F., may vary from ½ to 10 minutes, depending upon the exact temperature used.

The final step in producing a fly fishing line embodying the present invention consists in coating the surface of the line with a dressing consisting essentially of a primary plasticizer for the polyvinyl chloride, paraffin wax and a metal soap of the class consisting of aluminum, calcium and magnesium soaps.

The ingredient in the dressing of the present invention which is responsible for substantially increasing the water-repellency of the surface of the line is the paraffin wax. However, paraffin wax ordinarily forms large crystals, which would tend to flake off the line and would make it virtually impossible to apply a coating of satisfactory uniformity. This difficulty is overcome in the practice of the present invention by incorporating a metal soap in the dressing to inhibit crystallization of the paraffin wax.

Another essential ingredient in the dressing of the present invention is a substance which is a plasticizer for the polyvinyl chloride. It has been found that such a substance, when present in the dressing, preserves the plasticized polyvinyl chloride against stiffening with age, by counteracting loss of plasticizer from the plasticized polyvinyl chloride. This substance in the dressing also performs the function of thinning the paraffin wax to a consistency such that the dressing can be applied without difficulty. A thinner of solvent which is not a primary plasticizer for the polyvinyl chloride cannot be used as the sole thinner in the dressing, because such a substance would extract plasticizer from the plasticized polyvinyl chloride and thus cause rapid deterioration of the fishing line.

Thus the dressing of the present invention consists essentially of a primary plasticizer for the polyvinyl chloride, paraffin wax and a metal soap of the class consisting of aluminum, calcium and magnesium soaps. At least 50% by weight of the thinners or diluents for the paraffin wax in the composition should consist of a primary plasticizer or primary plasticizers for the polyvinyl chloride in the surface layer of the fishing line, so that loss of plasticizer from the plasticized polyvinyl chloride in the surface layer of the fishing line will be counteracted rather than accelerated by the dressing. However, a diluent or solvent which is substantially more volatile than the primary plasticizer in the dressing can be incorporated in the dressing in a larger proportion, because such a diluent or solvent disappears from the coating before it can extract plasticizer from the surface layer of the fishing line and therefore is not a material component of the dressing.

For example, the dressing may contain approximately 1% by weight of another water-repellent substance, such as a fluoro grease or oil, a silicone grease or oil, or finely divided Teflon.

The primary plasticizer in the dressing of the present invention may be any of the known primary plasticizers for polyvinyl chloride, or a mixture of such substances. Such substances have low volatility, and thus remain in the coating indefinitely and continue to counteract loss of plasticizer from the surface layer of the fishing line. Such substances include di-2-ethyl-hexyl phthalate, di-2-ethyl-hexyl sebacate, di-2-ethyl-hexyl azelate, diisooctyl phthalate, diisooctyl azelate, diisodecyl phthalate, ditridecyl phthalate, dicapryl phthalate, dioctyl adipate, dihexyl azelate, tricresyl phosphate, triphenyl phosphate, cresyldiphenyl phosphate, trioctyltrimellitate and octyl decyl adipate. Such substances are substantially non-volatile esters which are compatible with polyvinyl chloride.

Other diluents or solvents which may be present in the dressing in minor proportions include kerosene, high-boiling petroleum fractions, and various substances which are used as secondary plasticizers for polyvinyl chloride, such as chlorinated paraffins and chlorinated naphthalenes.

The amount of the primary plasticizer in the present dressing may range from one half to twice the weight of the paraffin wax.

Paraffin wax is unique in its ability to increase substantially the water-repellency of the plasticized polyvinyl chloride surface layer. Any available paraffin wax may be used in the dressing of the present invention.

The soap which is used in the dressing of the present invention to inhibit crystallization of the paraffin wax may be any soap of aluminum, calcium or magnesium, or a mixture of such soaps. A soap is considered to be a salt of a saturated or unsaturated fatty acid having at least seven carbon atoms, such as a stearate, oleate, or palmitate. The soaps include salts in which the fatty acid is less than the full equivalent amount, so that the molecules consist of hydroxy radicals as well as fatty acid radicals attached to the metal atoms. An example of a mixture which can be used is napalm, which is a soap whose molecules contain an average of two fatty acid radicals and one hydroxy radical for each aluminum atom, the fatty acid radicals being a mixture of oleic, naphthenic and palmitic acid radicals. The preferred soaps for use in the practice of the invention are aluminum soaps, such as aluminum stearate.

The amount of the soap in the present dressing is simply an amount which inhibits crystallization of the paraffin wax, and may range from 5% to 30% of the weight of the paraffin wax.

In the preparation of the dressing of the present invention, the soap and the plasticizer are readily dissolved in the molten paraffin wax at a temperature of about 125° F. While still warm, the dressing may be applied to the fishing line by any desired method, for example by passing the line continuously through a tank of the dressing and wiping the surplus dressing from the surface of the line. The dressing also may be applied by means of brushes or felt pads which have been moistened with the dressing, or may be applied with the fingers while fishing. An extremely thin coating of the dressing on the fishing line is sufficient.

The drawing shows a finished product embodying the invention, in which a braided core 11 composed of a multiplicity of filaments is coated with a thin layer of a primer 12 which forms the boundary between the core 11 and the surface layer 13. Microballoons 14 are dispersed throughout the surface layer, and the surface layer is coated with a thin film of a dressing 15.

A typical core 11 consists of a braided nylon core having a diameter of .025 inch and a total breaking strength of 15 pounds. If a line of higher tensile strength is desired, a core having a total breaking strength of 20 to 25 pounds may be used.

A typical surface layer 13 has the following composition in parts by weight:

| | Parts |
|---|---|
| Polyvinyl chloride (Geon 121) | 100 |
| Dioctyl adipate | 53 |
| Epoxidized tall oil (Flexol E P8) | 10 |
| Lead soap | 3 |

In addition to the above ingredients, a typical surface layer has dispersed therein glass microballoons having an average diameter of about 100 microns, which make up about 30% of the volume of the surface layer.

A typical dressing embodying the present invention consists of 10 parts by weight of paraffin wax, 2 parts of aluminum stearate and 10 parts of di-2-ethyl-hexyl sebacate. A dressing having this typical composition was tested by immersing, in a container filled with the dressing, a piece of line several inches long which had an initial diameter between .047 and .048 inch and which had the typical composition and structure above described. After one week of immersion in the dressing, the line was found to have become more flexible and to have increased in diameter to .050 inch.

In another experiment, a similar sample of the same line was immersed in a container filled with a dressing which was identical with the dressing used in the previous experiment except that the dressing contained only 7.5 parts of di-2-ethyl-hexyl sebacate, with the addition of 2.5 parts of kerosene. In this experiment, the sample of line was found to be unchanged after one week's immersion.

In a control experiment, a similar sample of the same line was immersed in a container filled with a liquid which was identical with the dressing used in the first experiment except that it contained 10 parts of kerosene instead of 10 parts of di-2-ethyl-hexyl phthalate. In this experiment, the sample of line after one week's immersion was found to have stiffened substantially, and to be only .045 inch in diameter.

In the first experiment, the surface layer gained plasticizer; in the third experiment plastizer was extracted from the surface layer; and in the second experiment the surface layer remained unchanged.

If the line coated with the dressing of the present invention is to be kept in a sealed container, it may be desirable to use a dressing having a composition similar to that of the dressing employed in the second experiment, in order to prevent an undesirable reduction in the stiffness of the line. However, under ordinary conditions, when the line is exposed to the atmosphere, it is not necessary to use any diluent in the dressing other than the primary plasticizer, and the dressing used in the first experiment gives excellent results, with no decrease in stiffness.

I claim:
1. In a fly fishing line the surface of which consists essentially of plasticized polyvinyl chloride wherein the improvement comprises a water-repellent preservative dressing on the surface of the line, consisting essentially of one part by weight of paraffin wax, a thinner for the paraffin wax, at least 50% by weight of the thinner consisting of one-half to two parts of at least one substantially non-volatile ester which is a primary plasticizer for polyvinyl chloride, and .05 to 0.3 part of a metal soap of the class consisting of aluminum, calcium and magnesium soaps to inhibit crystallization of the paraffin wax.

2. A fly fishing line according to claim 1 wherein the metal soap is an aluminum soap.

3. A fly fishing line according to claim 1 wherein the dressing additionally includes a minor proportion of a secondary plasticizer to prevent the primary plasticizer from softening the line.

References Cited

UNITED STATES PATENTS

| 2,215,760 | 9/1940 | Ledrich | 43—44.98 X |
|---|---|---|---|
| 2,223,158 | 11/1940 | Licata et al. | |
| 2,603,576 | 7/1952 | Cook et al. | |
| 2,748,525 | 6/1956 | Volz | 43—44.98 |
| 2,862,282 | 12/1958 | Beebe | 161—175 X |
| 3,043,045 | 7/1962 | Martuch | 43—44.98 |

WILLIAM D. MARTIN, Primary Examiner

RALPH HUSACK, Assistant Examiner

U.S. Cl. X.R.

43—44.98; 106—268; 117—87, 90, 92, 138.8, 141, 167, 168; 161—175